United States Patent
Shields

[15] 3,650,536
[45] Mar. 21, 1972

[54] ROTARY SHAFT SEAL STRUCTURE

[72] Inventor: Robert M. Shields, 4609 Carlyle Cir., Kettering, Ohio 45429

[22] Filed: Apr. 9, 1970

[21] Appl. No.: 26,868

[52] U.S. Cl. ............................................................. 277/93
[51] Int. Cl. ........................................................ F16j 15/34
[58] Field of Search .............................. 277/81, 93, 93 SD

[56] References Cited

UNITED STATES PATENTS

| | | | |
|---|---|---|---|
| 1,926,006 | 9/1933 | Kohler | 277/93 |
| 3,361,431 | 1/1968 | Liss et al. | 277/93 X |

FOREIGN PATENTS OR APPLICATIONS

| | | | |
|---|---|---|---|
| 1,159,713 | 7/1969 | Great Britain | 277/93 SD |

*Primary Examiner*—Robert I. Smith
*Attorney*—William R. Jacox and Jacox & Meckstroth

[57] ABSTRACT

Rotary shaft seal structure for sealing between a rotary shaft and a housing from which the shaft extends, the housing containing fluid. A stationary sealing member is carried by the housing and encompasses the shaft. A rotary sealing member is carried by the shaft and engages the stationary member. A drive member is secured to the shaft for rotation therewith. A control member joins the rotary sealing member to the drive member and applies a resultant force to the rotary sealing member which force is not parallel to the axis of rotation of the shaft. Thus, any movement of the rotary member with respect to the stationary member is both rotational and axial.

13 Claims, 7 Drawing Figures

Patented March 21, 1972

INVENTOR
ROBERT M. SHIELDS

BY William R Jacox

ATTORNEY

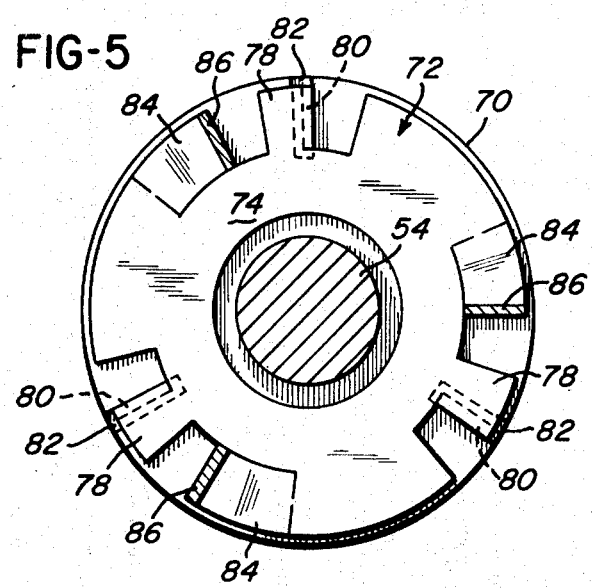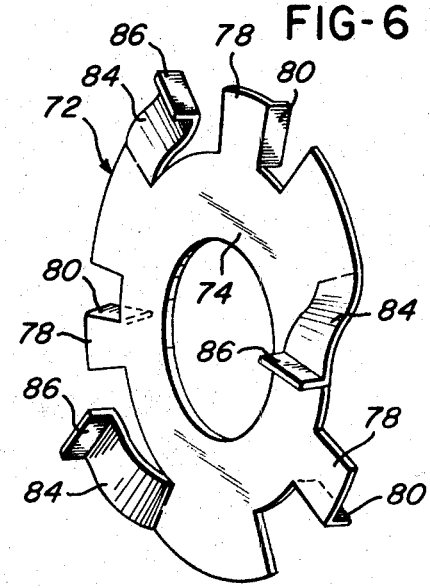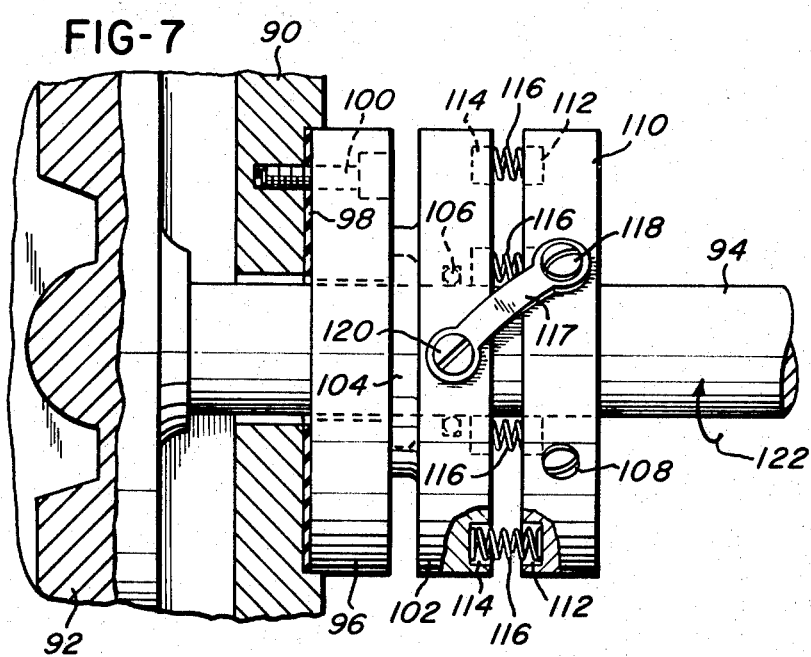
INVENTOR
ROBERT M. SHIELDS
BY William R Jacox
ATTORNEY 3,650,536

ROTARY SHAFT SEAL STRUCTURE

BACKGROUND OF THE INVENTION

In the past, numerous types of rotary shaft sealing structures have been employed to seal against leakage of fluid from a housing from which a rotary shaft extends.

A stuffing box type of device has been used which contains a soft material, such as hemp, cotton, leather, asbestos, and the like, which engages a shaft and the housing from which the shaft extends. Many of such materials are unable to withstand the chemical or physical reactions which occur as the fluid from the housing engages the material.

Numerous types of rigid mechanical sealing devices or elements have been employed, in which a rigid sealing ring rotates with the shaft and engages a stationary member which is carried by the housing. Such mechanical devices or elements have not been completely satisfactory, due to the fact that forces urging the sealing ring into engagement with the stationary member are parallel to the axis of rotation of the shaft and thus remain substantially constant, even though the fluid pressures within the housing may change. Thus, in the conventional types of sealing devices there is no provision for changes in sealing pressure with changes in fluid pressure, and there is no provision for changes in sealing pressure with changes in frictional forces between the sealing members. Thus, in the conventional types of sealing devices, at very high fluid pressures, there is leakage, and at low fluid pressures, frictional forces between the sealing ring and the stationary member may become excessive. Thus, poor sealing occurs at high fluid pressures and/or objectionable heating and wear of the sealing elements occur at low fluid pressures.

It is an object of this invention to provide rotary shaft seal structure which includes means for automatic control of sealing pressure so that sealing pressure is automatically adjusted with changes in frictional forces which occur between a movable sealing element and a stationary sealing element.

BRIEF DESCRIPTION OF THE VIEWS OF THE DRAWING

FIG. 5 is a sectional view, taken substantially on line 5—5 of FIG. 4.

FIG. 6 is a perspective view of a control element of the structure shown in FIGS. 4 and 5.

FIG. 7 is an elevational view, with parts broken away and shown in section, of another rotary shaft seal structure of this invention.

DETAILED DESCRIPTION OF THE PREFERRED EMBODIMENTS

Figure 1:
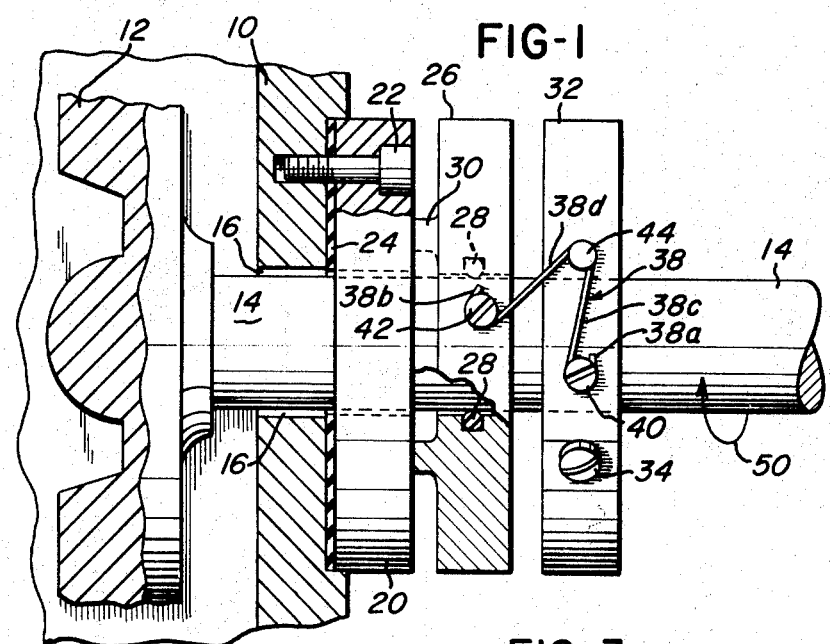
FIG. 1 is an elevational view, with parts broken away and shown in section of rotary shaft seal structure of this invention.

FIG. 1 shows a housing 10, which may contain a fluid pump, or mixer, or agitator, heat exchanger or the like. Herein a rotor 12 is shown within the housing 10 attached to a shaft 14, which extends from the housing 10 through an opening 16.

At the exterior surface of the housing 10 and freely encompassing the shaft 14 is a seat ring 20, which is shown attached to the housing 10 by means of one or more bolt members 22 or the like. A gasket 24 is disposed between the seat ring 20 and the housing 10. It is to be understood that within the purview of this invention the seat ring 20 may be a part of or integral with the housing 10.

Adjacent the seat ring 20 is a seal ring 26, which encompasses the shaft 14. An elastomeric O-ring 28 or the like snugly encompasses the shaft 14 and engages the seal ring 26 and prevents flow of fluid between the shaft 14 and the seal ring 26. The seal ring 26 has an axially extending annular protuberant engagement portion 30 which engages the seat ring 20.

Adjacent the seal ring 26 is a drive member 32 which is shown in the form of a ring encompassing the shaft 14. The drive member 32 is attached to the shaft 14 by a set screw 34 or by any other suitable means. It is to be understood that the drive member 32 is not necessarily annular.

Figure 2:
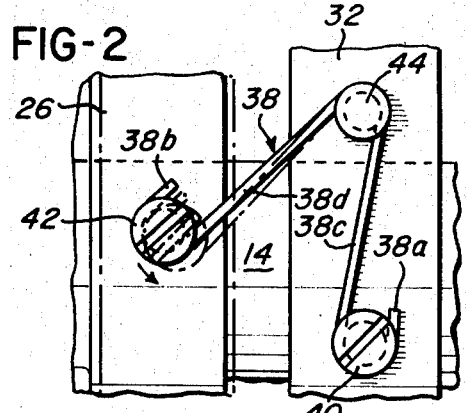
FIG. 2 is an enlarged fragmentary elevational view of a portion of the structure, illustrating operation thereof.
Figure 3:
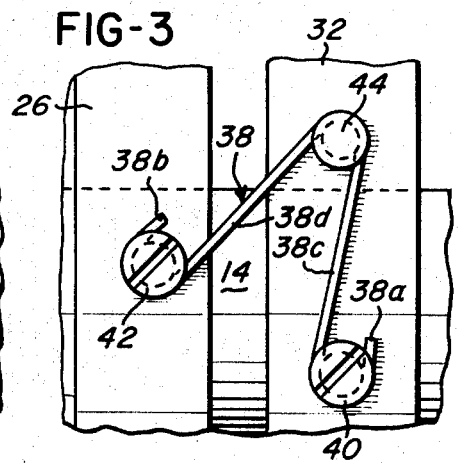
FIG. 3 is an enlarged fragmentary elevational view similar to FIG. 2, of a portion of the structure, illustrating a position of operation different from that of FIG. 1.

Extending between the seal ring 26 and the drive member 32 is a control member in the form of a substantially U-shaped resilient link member 38, which has an end portion 38a attached to the drive member 32 by means of a screw 40 and an end portion 38b attached to the seal ring 26 by means of a screw 42. A portion of the link member 38 which is intermediate the end portions 38a and 38b thereof partially encompasses a stem 44, which is attached to the drive member 32. The resilient link 38 may thus be considered as having a resilient arm 38c between the stem 44 and the screw 40 and a resilient arm 38d between the stem 44 and the screw 42. The natural resiliency of the link 38, as shown in FIGS. 1–3, tends to move the arms 38c and 38d one from the other. As shown in FIGS. 1–3, the arm 38d extends angularly through an arc of less than 90°.

OPERATION

As stated above, the rotor 12 may be a portion of a fluid motor or a fluid pump, as the housing 10 contains fluid. If the rotor 12 is a part of a fluid motor, the shaft 14 is driven thereby. If the rotor 12 is a part of a fluid pump, the shaft 14 has driver or motor means, not shown, connected thereto for rotation thereof and for rotation of the rotor 12. The shaft 14 is shown as rotating in the direction of an arrow 50.

As the shaft 14 rotates, the drive member 32, which is attached thereto, also rotates. The seal ring 26, as shown and discussed above, is joined to the drive member 32 by the resilient link member 38 and rotates with rotation of the shaft 14. Due to the fact that only the O-ring 28 joins the seal ring 26 to the shaft 14, the seal ring 26 may rotatively move with respect to the shaft 14. The degree of rotative movement of the seal ring 26 with respect to the shaft 14 is limited and controlled by the link member 38. The arm 38d of the resilient link 38 urges the seal ring 26 to move toward the seat ring 20. The resilient link 38 also urges the seal ring 26 to rotatively move in the direction of the rotation of the shaft 14. Therefore, the force applied by the resilient link 38 to the seal ring 26 is not parallel to the axis of rotation of the shaft 14. Thus, a given mechanical force is applied by the seal ring 26 to the seat ring 20, as the seal ring 26 rotates with rotation of the shaft 14.

As stated above, the shaft 14 extends freely through the opening 16 in the housing 10. The seat ring 20 freely encompasses the shaft 14. Thus, a portion of the fluid from within the housing 10 may pass through the opening 16 of the housing 10, through the passage formed between the seat ring 20 and the shaft 14, and into the small chamber formed by the seal ring 26 and the annular protuberant portion 30 thereof.

The mechanical sealing pressure of the annular protuberant portion 30 of the seal ring 26 upon the seat ring 20, urged by the resilient link member 38, prevents flow of fluid between the protuberant portion 30 and the seat ring 20. In the event the seal ring 26 tends to lag the rotation of the drive member 32 because of increased friction between the seal ring 26 and the seat ring 20, there is slight rotative movement between the seal ring 26 and the drive member 32 in a direction opposite that illustrated by the arrow 50. Due to the fact that the arm 38d is of a fixed length and separates the seal ring 26 from the drive member 32, any tendency of the seal ring 26 to rotatively move to lag behind the rate of rotation of the shaft 14 causes the arm 38d to move the seal ring 26 slightly axially in a direction from the seat ring 20, as illustrated in FIG. 2. Thus, movement of the seal ring 26 is both rotative and axial. FIG. 3 illustrates the position of the seal ring 26 after slight movement thereof in a direction from the seat ring 20.

Of course, any movement of the seal ring 26 in a direction from the seat ring 20 results in a reduction of the frictional forces between the seal ring 26 and the seat ring 20. Thus, there is a reduction in the mechanical sealing pressure applied by the protuberant portion 30 to the seat ring 20.

The seal ring 26 may tend to lag the rotation of the shaft 14 as a result of reduction in fluid pressure within the housing 10, which reduces leakage of fluid between the seal ring 26 and the seat ring 20. Movement of the seal ring 26 with respect to the seat ring 20, as described above and as shown in FIGS. 2 and 3, compensates for reduction in fluid pressure in the housing 10, as such movement of the seal ring 26 from the seat ring 20 permits greater leakage of fluid therebetween for lubrication thereof.

It is to be understood that any movement of the protuberant portion 30 of the seal ring 26 in a direction from the seat ring 20 is extremely slight, and the movement illustrated in FIGS. 2 and 3 may be considered to be exaggerated for the purpose of illustration. Actually, rather than movement of the seal ring 26 from the seat ring 20, only a reduction in mechanical pressure therebetween may occur.

As indicated above, frictional forces between the protuberant portion 30 and the seat ring 20 may tend to change for various reasons. Any tendency to change such frictional forces is automatically compensated by the resulting tendency of the seal ring 26 to rotatively move with respect to the shaft 14. The resilient forces of the link member 38 and the fixed length of the arm 38d cause a slight change in the position or pressure of the seal ring 26 with respect to the seat ring 20 as changes in frictional forces between the protuberant portion 30 and the seat ring 20 occur. Due to the fact that the resilient arm 38d constantly urges axial and rotative movement of the seal ring 26 toward the seat ring 20, any reduction in frictional forces therebetween permits the arm 38d to move the seal ring 26 toward the seat ring 20. Thus, compensation automatically occurs.

It is to be understood that more than one link member 38 may be employed in the structure shown in FIGS. 1-3 if found desirable or necessary.

Figure 4:
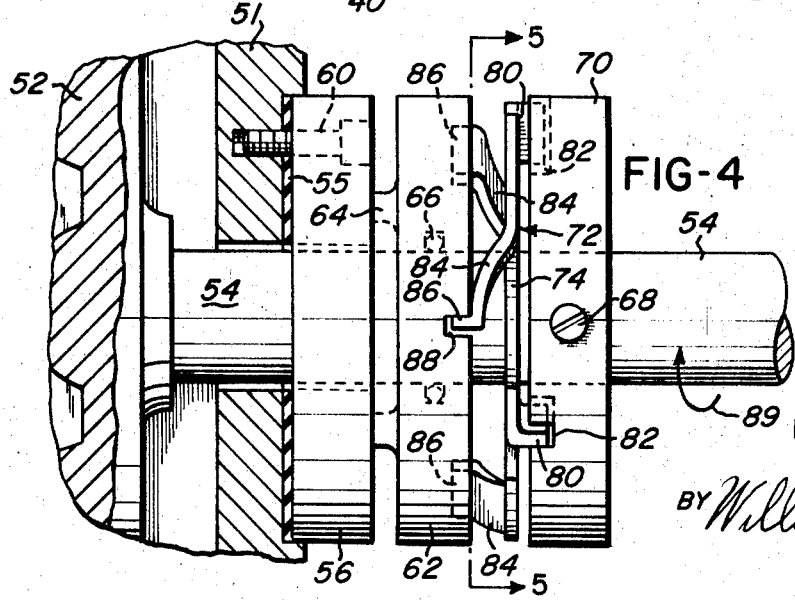
FIG. 4 is an elevational view, with parts broken away and shown in section, of another rotary shaft seal structure of the invention.

FIGS. 4, 5, and 6

FIGS. 4, 5, and 6 illustrate another rotary shaft seal structure of this invention.

A housing 51, a rotor 52, a shaft 54, a seat ring 56, a gasket 58, and a bolt 60 are similar to those identified above by the reference numerals 10, 12, 14, 20, 24, and 22, respectively.

A seal ring 62 encompasses the shaft 54 and has an annular protuberant engagement portion 64 which engages the seat ring 56. An elastomeric O-ring 66 is positioned between the seal ring 62 and the shaft 54.

Adjacent the seal ring 62 and secured to the shaft 54 by means of a set screw 68 is a drive member 70.

Between the drive member 70 and the seal ring 62 is a control member 72 which is a generally disc-shape member having an annular portion 74 which encompasses the shaft 54. A plurality of arms are integral with the annular portion 74 and extend therefrom. Arms 78 extend from the annular portion 74, and each arm 78 has a finger 80 within a notch 82 of the drive member 70. Resilient arms 84 extend from the annular portion 74 toward the seal ring 62, and each arm 84 has a finger 86 within a notch 88 of the seal ring 62.

The shaft 54 rotates in the direction illustrated by an arrow 89. The seal ring 62 is free to move rotatively when frictional forces between the protuberant portion 64 and the seat ring 56 change.

The control member 72 serves in substantially the same manner as the resilient link 38 to permit relative rotative movement between the seal ring 62 and the shaft 54. Due to the fact that the arms 84 of the control member 72 are of a fixed length, when rotation of the seal ring 62 tends to lag that of the shaft 54, the arms 78 and 84 require that rotative movement of the seal ring 62 must be associated with movement of the seal ring 62 in a direction from the seat ring 56. Thus, the pressure between the seat ring 56 and the seal ring 62 is reduced. If frictional values between the seal ring 62 and the seat ring 56 are reduced, the seal ring 62 tends to move freely with rotation of the shaft 54. When this occurs, the seal ring 62 is rotatively and linearly moved by the control member 72 toward the seat ring 56.

FIG. 7

FIG. 7 shows another rotary shaft seal structure of this invention.

A housing 90, a rotor 92, a shaft 94, a seat ring 96, a gasket 98, and a bolt 100 are similar to those identified above by reference numerals 10, 12, 14, 20, 24, and 22, respectively.

A seal ring 102 encompasses the shaft 94 and has an annular protuberant engagement portion 104 which engages the seat ring 96. An elastomeric O-ring 106, within the seal ring 102, engages the shaft 94 and the seal ring 102.

Adjacent the seal ring 102 and secured to the shaft 94 by means of a set screw 108 is a drive member 110. The drive member 110 has recesses 112, and the seal ring 102 has recesses 114, in alignment therewith. Spring members 116 serve as control members and are positioned within the recesses 112 and 114 and urge movement of the seal ring 102 in a direction from the drive member 110. The recesses 112 are considerably greater in diameter than the diameter of the spring members 116 to permit freedom of angular movement of the spring members 116 as the seal ring 102 rotatively moves with respect to the drive member 110.

A control member in the form of a rigid link 117 is pivotally attached to the drive member 110 by means of a screw pin 118. The link 117 is pivotally attached to the seal ring 102 by means of a screw pin 120. The shaft 94 rotates in the direction indicated by an arrow 122. When the seal ring 102 tends to lag the rate of rotation of the shaft 94, as a result of a change in the frictional values between the seal ring 102 and the seat ring 96, there is relative rotational movement between the seal ring 102 and the seat ring 96. The link 117, being of a fixed length, causes the seal ring 102 to move slightly in a direction from the seat ring 96, if the seal ring 102 tends to lag rotation of the drive member 110. Thus, the pressure of the seal ring 102 against the seat ring 96 is reduced. Such movement of the seal ring 102 is against the forces of the spring members 116, which also serve as control members. Therefore, when frictional forces between the seal ring 102 and the seat ring 96 are again reduced, the spring members 116 cause the seal ring 102 to move toward the seat ring 96. Such axial movement of the seal ring 102 also results in rotative movement thereof, as the angular relationship of the link 117 with respect to the seal ring 102 and the drive member 110 determines the spacing therebetween.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having been thus described, the following is claimed:

1. Rotary shaft seal structure of the type provided with a rotary shaft, comprising:
   a seat member fixed in position and freely encompassing the rotary shaft,
   a seal member encompassing the rotary shaft and having an annular engagement portion in engagement with the seat member,
   a drive member secured to the shaft for rotation with the shaft adjacent the seal member, control means joining the drive member to the seal member to effect rotation of the seal member with the drive member, the control means being effective to force the seal member axially into frictional sealing engagement with the seat member and to reduce the axial force of the seal member against the seat member in response to an increase in frictional forces between the seal member and the seat member, the control means including a plurality of link members each of which pivotally connects the seal member to the drive member within a rotative angle of 90°.

2. The structure of claim 1 in which each of the link members comprise a pair of resilient U-shape arms, one arm being attached to the seal member and one arm being attached to the drive member.

3. The structure of claim 1 in which each of the link members has an end portion attached to the seal member and an end portion attached to the seat member, and a stem attached to the drive member, the midportion of the resilient U-shape link member partially encompassing the stem.

4. The structure of claim 1 in which the control means includes a disc and the link members an integral part of the disc.

5. The structure of claim 1 in which the control means comprises a rigid link pivotally attached to the drive member and pivotally attached to the seal member, spring means engaging the seal member and the drive member and urging movement thereof one from the other.

6. In combination,
a housing having an opening therethrough,
a rotatable shaft extending from the housing through the opening,
the housing including an annular seat member encompassing the shaft,
an annular seal member encompassing the shaft and engaging the seat member, the seal member being axially and rotatably movable with respect to the shaft,
a drive member adjacent the seal member and attached to the shaft for rotation therewith,
pivotal and resilient control means joining the drive member to the seal member and controlling the relative rotative and axial position of the seal member with respect to the seat member, the control means effecting forward rotation of the seal member with the drive member and forcing the seal member against the seat member, the control means reducing the force of the seal member against the seat member with rearward rotative movement of the seal member with respect to the drive member, the control means including at least one link member joining the drive member directly to the seal member within 90° of rotation.

7. The combination of claim 6 in which the link member includes resilient arm means pivotally joined to the seal member and to the seat member.

8. The combination of claim 6 in which the control means includes an annular disc, arm means carried by the disc member and engaging the seal member and the drive member.

9. The combination of claim 8 in which at least some of the arm members are resilient.

10. The combination of claim 6 in which the control means includes a plurality of compression spring members and a rigid link which is pivotally joined to the drive member and which is pivotally joined to the seal member.

11. Structure of the type described comprising:
a housing having an opening therethrough,
a shaft extending from the housing through the opening therein,
a seat ring carried by the housing and encompassing the shaft,
a seal ring carried by the shaft, the seal ring being in engagement with the seat ring,
a U-shape resilient member having a first arm and a second arm,
means attaching the first arm to the seal ring,
means attaching the second arm to the shaft,
the U-shape resilient member thus urging rotative and linear movement of the seal ring toward the seat ring.

12. The structure of claim 11 in which the means attaching the second arm to the shaft includes a drive member,
the second arm having an end portion attached to the drive member,
the first arm having an end portion attached to the seal ring,
a stem attached to the drive member, the U-shape resilient member having a midportion partially encompassing the stem,
the first arm extending between the stem and the seal ring, the first arm being angular with respect to the axis of the shaft.

13. Seal structure for a rotary shaft which extends from a fluid housing, comprising:
an annular valve seat member carried by the housing and encompassing the shaft,
an annular seal member encompassing the shaft and in engagement with the seat member,
means including at least one link member pivotally connecting the seal member directly to the shaft within 90 rotation all degrees to effect rotation of the seal member with the shaft and being effective to urge the seal member axially toward and against the seat member, causing frictional forces between the seal member and the seat member, said means being further effective to reduce the axial force of the seal member against the seat member in response to an increase in frictional forces between the seal member and the seat member.

* * * * *